US 6,987,718 B2

(12) United States Patent
Winter et al.

(10) Patent No.: US 6,987,718 B2
(45) Date of Patent: Jan. 17, 2006

(54) OPTICAL DISC COPY PREVENTION SYSTEM

(75) Inventors: Andreas Winter, Altenmarkt (AT); Stefan Podhajski, St. Johann (AT)

(73) Assignee: Sony DADC Austria AG, Anif (AT)

( * ) Notice: Subject to any disclaimer, the term of this patent is extended or adjusted under 35 U.S.C. 154(b) by 534 days.

(21) Appl. No.: 10/009,648

(22) PCT Filed: Mar. 8, 2001

(86) PCT No.: PCT/EP01/02633

§ 371 (c)(1),
(2), (4) Date: Dec. 5, 2001

(87) PCT Pub. No.: WO01/78074

PCT Pub. Date: Oct. 18, 2001

(65) Prior Publication Data

US 2002/0186629 A1   Dec. 12, 2002

(30) Foreign Application Priority Data

Apr. 7, 2000   (EP) .................................. 00107599

(51) Int. Cl.
*G11B 7/09*   (2006.01)
(52) U.S. Cl. .................. 369/53.2; 369/59.12; 711/154
(58) Field of Classification Search ............... 369/53.2, 369/59.12; 711/154
See application file for complete search history.

(56) References Cited

U.S. PATENT DOCUMENTS

| | | | |
|---|---|---|---|
| 5,086,495 A | * | 2/1992 | Gray et al. .................. 345/420 |
| 5,809,006 A | * | 9/1998 | Davis et al. ............. 369/47.49 |
| 6,005,839 A | | 12/1999 | Sako et al. |
| 6,096,962 A | * | 8/2000 | Crowley ...................... 84/611 |
| 6,469,968 B1 | * | 10/2002 | Van Den Enden et al. ........................ 369/59.12 |
| 6,532,201 B1 | * | 3/2003 | Hogan ..................... 369/53.21 |
| 6,721,859 B1 | * | 4/2004 | Smyers ....................... 711/154 |

FOREIGN PATENT DOCUMENTS

| | | |
|---|---|---|
| WO | WO 98/08180 | 2/1998 |
| WO | WO 00/67095 | 11/2000 |

* cited by examiner

*Primary Examiner*—Gautam R. Patel
(74) *Attorney, Agent, or Firm*—Frommer Lawrence & Haug LLP; William S. Frommer

(57) ABSTRACT

Software is securely distributed with limited usage rights. The software may be an executable program and/or one or more data files such as image or multimedia data files. The software includes an access control object which prevents at least some usage of the software without use of a first access control code. The first access control code is produced based on selected information characteristic of the user's computer system. The access control code is produced in a server computer to which the user directs a request for the access control code. The user makes a payment to receive the access control code, which is then downloaded to the user's computer system.

16 Claims, 3 Drawing Sheets

Figure 1: CD frame format

*Figure 2: Decoding process*

OPTICAL DISC COPY PREVENTION SYSTEM

The present invention relates to a copy protection method for record carriers, i.e storage media, which store digital data as an asynchronous signal, e.g. Compact Discs (CDs) and Digital Versatile Discs (DVDs) including all existing or future formats of CD and DVD or other Optical Storage Media which work according to a similar concept.

In particular, the copy protection method according to the present invention prevents of the ability to make a physical copy or creating a complete data image of the media content.

Optical storage discs with information stored on one or both sides have come to be used for a variety of purposes, most notably in the music, games, video and computer industry. Digital information is stored on the optical storage media in the form of pits arranged along circular, concentric tracks on one or on both sides of the disc. The track is typically read from the inside out, but may also be read form outside in, as it is already used for some optical storage media.

The data itself on the track is subdivided into frames, each equal in length, containing equal amounts of information. Each frame has a dedicated layout depending on the type of optical storage media (CD, DVD). Such a frame always contains the user data symbols itself but also data for synchronization, merging data between data symbols and error correction.

The signal on a optical storage medium itself is asynchronous, which means that in the decoding process synchronization and timing information has to be spied out from the signal.

Due to the nature of such storage media copies can be made easily. To cope with this situation, there exist various copy protection schemes which try to prevent unauthorized access with the help of keys or passwords stored on the respective storage medium itself. Further, there exist methods which secure an optical disc with the help of stored invalid information which gets repaired during the copy process so that an application program can determine whether it is stored on an original or on a copy based on the presence or absence of this invalid information.

However, theses copy protection schemes only prevent the copying in an indirect way, i.e. copying is possible and only the access of a copied record carrier might be restricted.

Further, U.S. Pat. No. 6,005,839 describes a copy protection scheme for optical record carriers, in particular DVDs, according to which direct or dump copying is prohibited by inserting a synchronization pattern at an irregular position different from the regular position or by inserting a synchronization pattern different to the standard synchronization pattern at the regular position of certain areas or sectors of the optical record carrier. To assure an undisturbed reproduction of such a record carrier the reproducing obstructing area created with the misleading synchronization patterns is skipped by jumping based on position designating information (designating the reproducing obstructing area) which is recorded on the record carrier, preferably in the Table Of Contents (TOC) area.

Therefore, it is an object underlying the present invention to provide an improved copy protection method, i.e. a method to produce a record carrier which comprises an improved copy protection, a record carrier with an improved copy protection, and a record carrier writing device which can produce such record carriers.

The method according to the present invention is defined in independent claim 1, a record carrier with a copy protection according to the present invention is defined in independent claim 11, and a record carrier writing device which can produce such record carriers is defined in independent claim 20. Preferred embodiments thereof are respectively defined in the claims dependent thereon. In particular, claims 9 and 10 define a computer program working according to the inventive method.

The central feature of the present invention is to write additionally generated data to at least one specific portion of the record carrier so that a general purpose reading device which can access record carriers of different formats which accesses said record carrier judges said record carrier to be unaccessable and that a record carrier according to the present invention comprises at least one specific portion with such additionally generated data.

Therewith, according to the present invention such additionally generated data which confuses a reading device is inserted in such areas which are not accessed by a reading device designed for that type of record carriers, e.g. a normal audio CD player for audio CDs, but which are always accessed by a general purpose reading device, e.g. a CDROM reading device.

The additionally generated data is generated and stored additionally to the data intended to be recorded and the data needed for accessing the data intended to be recorded.

The term 'write . . . to at least one specific portion of the record carrier' is not restricting the scope to a direct writing to the record carrier, e.g. to a CDR (CD recordable), but also includes the wanting to a master from which record carriers are replicated.

Record carriers of different formats are not only different types of record carriers, e.g. CDs and DVDs, but also one type of record carriers which can record multiple sessions of the same or different types.

A session in this sense means a data stream recorded without interruption with a lead-in portion at the beginning, a lead-out portion at the end, and eventually a middle area in-between different parts of the data stream.

According to the present invention said data generation comprises the step of generating at least one special pattern which is decoded so that no clock regeneration of the stored data can be performed by said reading device when accessing the at least one specific portion of the record carrier which stores said special pattern.

In case a reading device tries to access the specific portion comprising the so generated data it is not possible for said reading device to regenerate the clock of the stored data. In this case the general purpose reading device will generate an error message indicating that the inserted record carrier is not accessable.

Alternatively or additionally to achieve such a result said data generation comprises the step of copying a synchronization pattern at least once into said at least one specific portion of the record carrier at a respective position normally not having a synchronization pattern. In this case the reading device trying to access the specific portion does not find the correct synchronization, since it gets confused by the higher number of synchronization patterns, and the result is the same as in the case described before. Such a copying also includes the simulation of a synchronization pattern by modifying standard data bytes to look like a synchronization pattern.

Therewith, according to the present invention a method is defined how to modify the physical data stream on an optical storage disc to influence the decoding process in a way, that it is impossible to find the exact synchronization and timing.

This may lead either to stopping of the decoding process or at least to a wrong decoding of data symbols.

However, according to the present invention this influencing of the decoding process is only performed in case a general purpose reading device which can access record carriers of different formats, i.e. record carriers which can record multiple sessions, tries to access the record carrier provided with the copy protection according to the present invention. Reading devices which are specially designed for a record carrier of a predetermined format, e.g. audio data recorded in one session, can still access a record carrier provided with the copy protection according to the present invention if that patterns are e.g. included in the lead-in portion of the second session. General purpose reading devices which support multiple formats need to at least analyze the lead-in portion of the second session and in this way the decoding process gets confused. Such reading devices which are specially designed for a record carrier of a predetermined format are not limited to new specially adapted reading devices, but all existing reading devices of this type already fulfill the necessary requirements.

This strategy according to the present invention is also applicable to the pregap portion of an audio CD, i.e. the gap portion before the audio content starts.

Alternatively or additionally to the inserted patterns for misleading the clock regeneration or the synchronization, it is also possible to generate a modified pointer to a further session on a multi session record carrier. Such a pointer to a further session on a multi session record carrier, in the following also referred to as session pointer, is arranged in the lead-in portion of a session and points to the beginning of the data area of the following session. An appropriate modification of this pointer leads to the wanted confusion of the general purpose reading device. According to the present invention, preferrably a recursive pointer might be defined, further preferrably in the third session, which does not point to the beginning of the data area of the following session, but to the beginning of the data area of the same session. In case a general purpose reading device tries to access the so modified record carrier, it gets confused and judges this record carrier as unaccessable.

Furthermore, it is an object underlying the present invention to provide a general purpose reading device which can access record carriers provided with the copy protection according to the present invention.

This object is solved by a record carrier accessing device according to independent claim 19 which is switchable or preprogramable to not read at least one predetermined portion of a predetermined type of record carriers to be accessed namely to not read the at least one specific portion of the record carrier which stores the above described additionally generated data.

The accompanying drawings, which are incorporated in and constitute a part of this specification, illustrate embodiments of the invention and together with a general description of the invention given above, and the detailed description of the embodiment given below, serve to explain the principles of the invention, wherein.

The following description shows as an example how to modify the physical data stream of an audio CD to prevent correct decoding within a multi session capable reading device, i.e. a general purpose reading device. The format of the physical data stream is specified in the 'Red Book' specification and IEC 908.

The physical data stream on a CD is optimized in multiple ways to reduce errors and guarantee a simple decoding mechanism. Therefore every 3 to 11 bits must be a transition of the signal. Within the data symbols this is guaranteed by the EFM (Eight to Fourteen Modulation). The audio data is split into 8 bit symbols which are converted to a 14 bit symbol with the EFM table. This table consist of 256 entries of 14 bit values which are combinations of bits which contain more than 2 but less than 10 zeros continuously. Every '1' in the 14 bit symbol represents a transition of the signal. To also guarantee this restriction when symbols are concatenated there are additional 3 bits of merging, which must be chosen accordingly. The resulting signal between two transitions are called pits and lands. The length of each is bounded between 3 and 11 times the base length.

The final frame of audio data contains the following data:

| | |
|---|---|
| 1 synchronization symbol | 24 bits |
| 1 subcode byte | 14 bits (EFM encoded) |
| 24 data bytes | 336 bits (EFM encoded) |
| 8 parity bytes | 112 bits (EFM encoded) |
| 34*3 merging bits | 102 bits |
| TOTAL | 588 bits |

Figure 1:
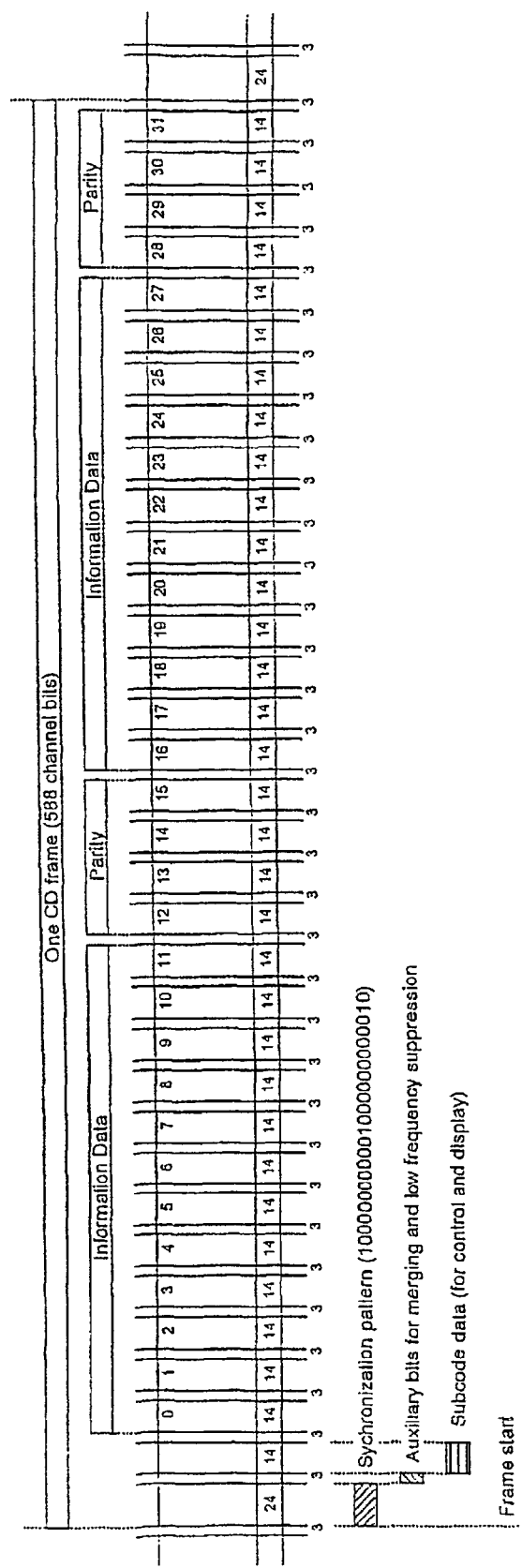
FIG. 1 illustrates the CD frame format.

The bits are composed is the way as shown in FIG. 1. The order of one CD frame is as follows: the synchronization pattern of 24 bits is followed by 3 auxiliary bits for merging and low frequency suppression; thereafter 14 bits subcode data are followed by 3 auxiliary bits for merging and low frequency suppression; thereafter 12 blocks of 14 bits information data are respectively followed by 3 auxiliary bits for merging and low frequency suppression; thereafter 4 blocks of 14 bits parity data are respectively followed by 3 auxiliary bits for merging and low frequency suppression: thereafter 12 blocks of 14 bits information data are respectively followed by 3 auxiliary bits for merging and low frequency suppression; and finally 4 blocks of 14 bits parity data are respectively followed by 3 auxiliary bits for merging and low frequency suppression.

Figure 2:
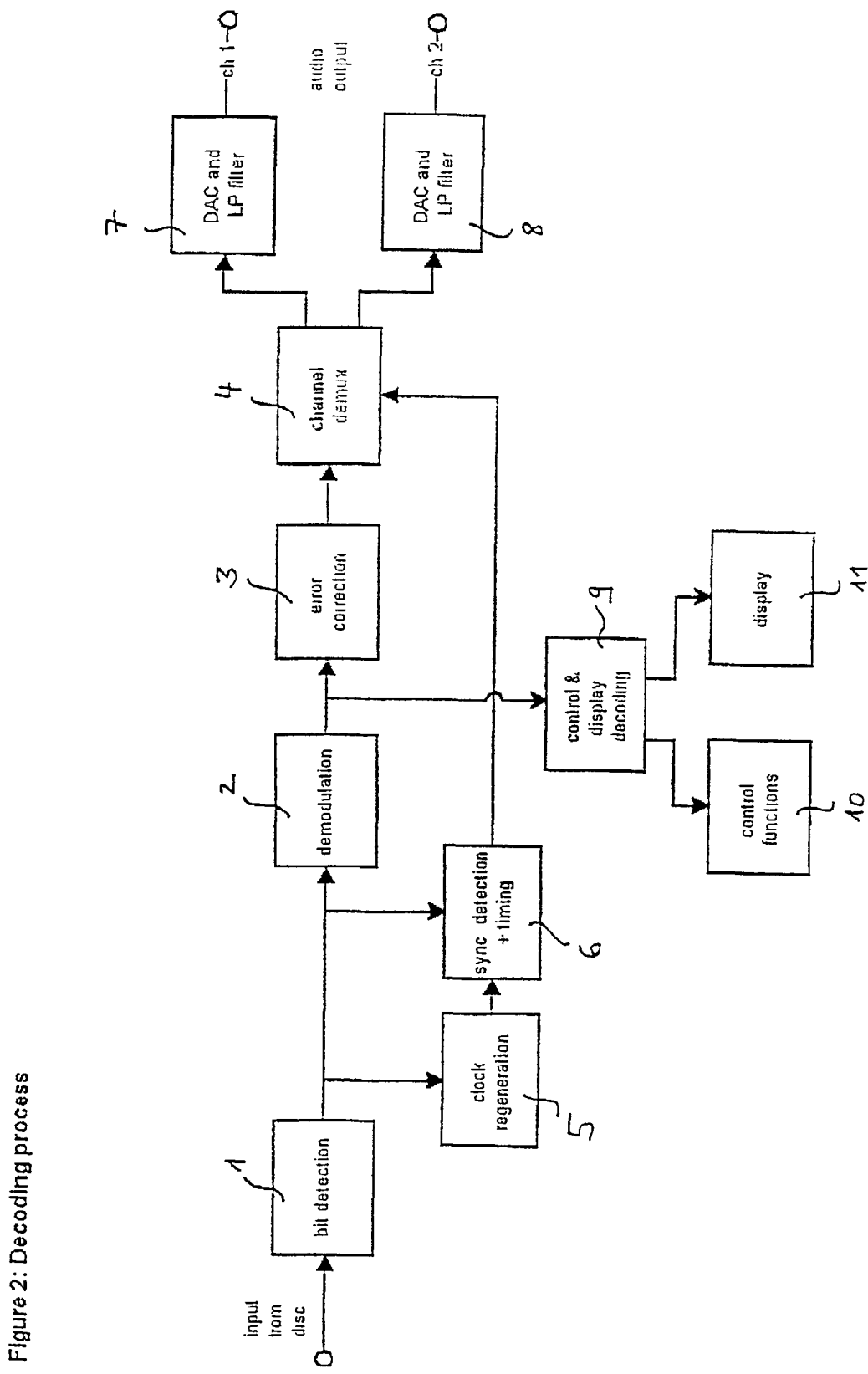
FIG. 2 shows the decoding process for record carriers which store data in asynchronous streams.

FIG. 2 illustrates the decoding process, which can be influenced according to the present invention by confusing either the clock regeneration or the synchronization detection and timing.

The input signal to the decoder read out from the disc undergoes a bit detection 1 followed by a demodulation 2 with following error correction 3 and channel demultiplexing 4. The output signal from the bit detector 1 is input to a clock regeneration circuit 5 and also to a synchronization detection and timing circuit 6 which additionally receives the output signal of the clock regeneration circuit 5. The synchronization detection and timing circuit 6 supplies its output signal to the channel demultiplexer 4 which outputs a first signal to a D/A converter and lowpass filter 7 to generate the first channel ch1 of audio output and a second signal to a D/A converter and lowpass filter 8 to generate the second channel ch2 of audio output. The output signal from the demodulator 2 is additionally input to a control and display decoding unit 9 which supplies a control functions means 10 and a display 11 with input signals.

Confusing Clock Regeneration

Normally data symbols vary in the data signal, so each pit length should be available within some frames. Each CD drive uses special patterns for retrieving clocking information out of the signal, if this pattern is not available the CD drive is not able to continue decoding. Usage of certain patterns for user data allows to remove patterns which a CD drive needs for clock regeneration and so prevents to decode data correctly.

Confusing Synchronization and Timing

The synchronization symbol is the bit sequence '10000000000100000000010' which include 3 transitions of the signal. Normally the merging algorithm has to be selected in a way to avoid that this signal occurs within the data symbols. Searching the data stream for this signal makes it possible for the decoder to find the start of a CD frame. Usage of certain patterns for user data and modifying the merging algorithm allows to have the synchronization symbol multiple times within a frame which so prevents that the CD drive finds the correct synchronization symbol (start of frame) and furthermore prevents to decode data correctly.

Figure 3:
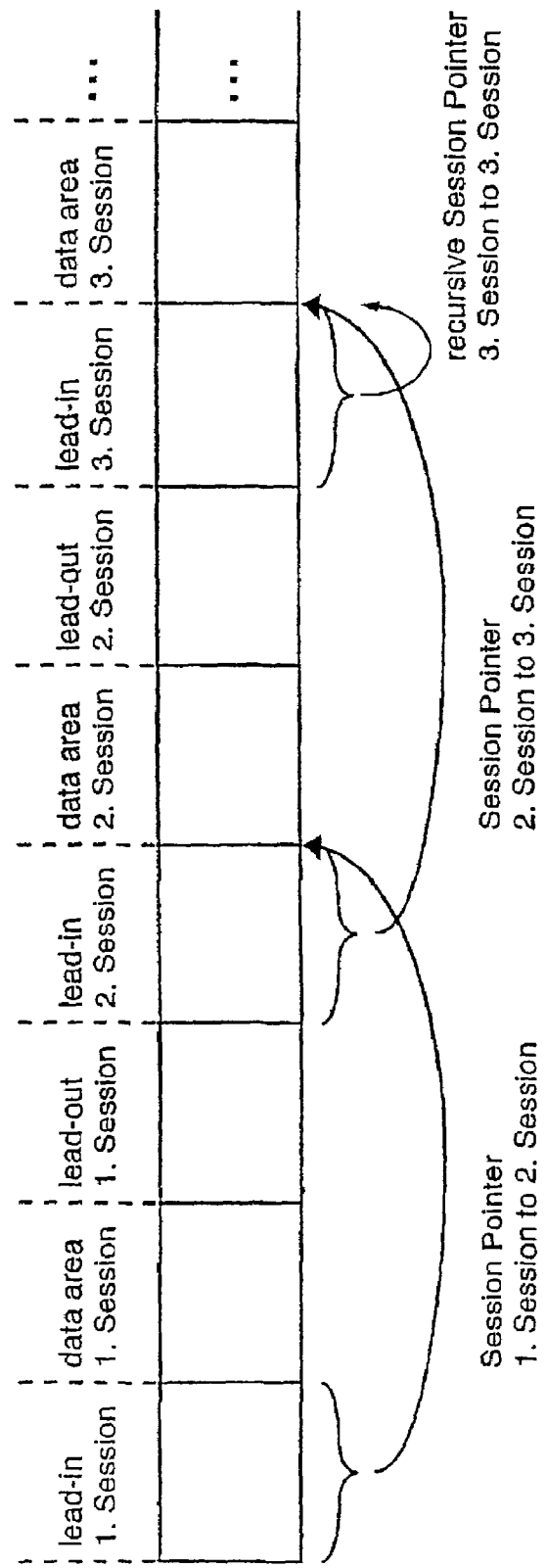
FIG. 3 elucidates the principle of a recursive session pointer according to the present invention.

FIG. 3 elucidates the principle of session pointers, i.e. pointers arranged in the lead-in portion of a session pointing to the beginning of the data area of the respectively directly following session which is modified according to a preferred embodiment of the present invention in that one of these session pointers, here the session pointer normally pointing from the lead-in portion of the third session to the beginning of the data area of the fourth session, is a recursive pointer and points to the beginning of the data area of the session in which it itself is arranged, here to the beginning of the data area of the third session. This principle is elucidated for an audio CD modified according to the present invention which comprises at least three sessions, each of which has a lead-in portion, a data area, and a lead-out portion.

According to the present invention, both methods of confusing decoding can be used for copy prevention independently or together because the decoding gets out of order. Further, also the arrangement of a recursive session pointer might be used alone or together with the confusing decoding according to the present invention. An intelligent placement of regions where the signal is modified for copy prevention allows to keep ability of playback of user data with a reading device specially adapted to the recorded user data, e.g. to audio data recorded on audio CDs, but prevents of making a copy.

Similar modifications can be done for DVD, which uses similar layout of the signal and for the decoding process.

What is claimed is:

1. Method to produce a record carrier which stores data as an asynchronous signal, characterized by the following step:
   writing additionally generated data to at least one specific portion of the record carrier so that a general purpose reading device which can access record carriers of different formats which accesses said record carrier judges said carrier to be unaccessable, characterized in that said additionally generated data is a recursive session pointer.

2. Method according to claim 1, characterized in that said data generation comprises the step of generating at least one special pattern which is decoded so that no clock regeneration of the stored data can be performed by said reading device when accessing the at least one specific portion of the record carrier which stores said special pattern.

3. Method according to claim 1 characterized in that said data generation comprises the step of copying a synchronization pattern at least once into said at least one specific portion of the record carrier at a respective position normally not having a synchronization pattern.

4. Method according to claim 1, characterized in that said generated data is arranged to be written to a lead-in portion and/or a middle area and/or a lead-out portion of a session recorded on the record carrier.

5. Method according to claim 1, characterized in that said recursive session pointer is arranged in the third session.

6. Method according to claim 1, characterized in that said record carrier is a CD or DVD.

7. Record carrier which stores data as an asynchronous signal, characterized by additionally generated data within at least one specific portion of the record carrier so that a general purpose reading device which can access record carriers of different formats which accesses said record carrier judges said record carrier to be unaccessable, characterized in that said additionally generated data is a recursive session pointer.

8. Record carrier according to claim 7, characterized in that said additionally generated data comprises at least one special pattern which is decoded so that no clock regeneration of the stored data can be performed by said reading device when accessing the at least one specific portion of the record carrier which stores said special pattern.

9. Record carrier according to claim 7, characterized in that said additionally generated data comprises at least one synchronization pattern at a respective position normally not having a synchronization pattern.

10. Record carrier according to claim 7, characterized in that said additionally generated data is arranged within a lead-in portion and/or a middle area and/or a lead-out portion of a session recorded on the record carrier.

11. Record carrier according to claim 7, characterized in that said recursive session pointer is arranged in the third session.

12. Record carrier according to claim 7, characterized in that said record carrier is a CD or DVD.

13. Record carrier writing device for writing record carriers which store data as an asynchronous signal, characterized by being able to write additionally generated data to at least one specific portion of the record carrier so that a general purpose reading device which can access record carriers of different formats which accesses said record carrier judges said record carrier to be unaccessable, said additionally generated data being a recursive session pointer.

14. Record carrier writing device according to claim 13, characterized by being able to write patterns to said at least one specific portion of the record carrier so that for a reading device no clock regeneration of the stored data can be performed when accessing said at least one specific portion of said record carrier.

15. Record carrier writing device according to claim 13, characterized by being able to write synchronization patters to said at least one specific portion of the record carrier outside areas which are defined for synchronization patterns.

16. Record carrier writing device according to claim 13, characterized by being able to write said recursive session pointer in the third session.

* * * * *